(12) United States Patent
Horst

(10) Patent No.: US 8,316,708 B2
(45) Date of Patent: Nov. 27, 2012

(54) ILLUMINATED SIGHT GLASS

(75) Inventor: George Horst, Omaha, NE (US)

(73) Assignee: JIKOH Manufacturing, Inc., Omaha, NE (US)

( * ) Notice: Subject to any disclaimer, the term of this patent is extended or adjusted under 35 U.S.C. 154(b) by 531 days.

(21) Appl. No.: 12/430,477

(22) Filed: Apr. 27, 2009

(65) Prior Publication Data

US 2010/0269584 A1   Oct. 28, 2010

(51) Int. Cl.
*G01F 23/02* (2006.01)

(52) U.S. Cl. ............ 73/323; 73/293; 73/865.8; 116/276

(58) Field of Classification Search .................. None
See application file for complete search history.

(56) References Cited

U.S. PATENT DOCUMENTS

| | | | | |
|---|---|---|---|---|
| 1,977,603 A * | 10/1934 | Weston | | 73/293 |
| 2,332,088 A * | 10/1943 | Allcott | | 73/293 |
| 3,745,967 A * | 7/1973 | Smith et al. | | 116/275 |
| 3,818,470 A * | 6/1974 | Hirsbrunner et al. | | 340/619 |
| 4,064,826 A * | 12/1977 | Pauli | | 116/276 |
| 4,601,381 A * | 7/1986 | Nukala et al. | | 196/114 |
| 5,072,595 A * | 12/1991 | Barbier | | 62/129 |
| 5,125,269 A * | 6/1992 | Horst, Jr. | | 73/323 |
| 5,243,929 A * | 9/1993 | Brown et al. | | 116/276 |
| 6,664,558 B1 * | 12/2003 | Barbier | | 250/577 |
| 6,782,184 B2 * | 8/2004 | Canty et al. | | 385/138 |
| 6,848,481 B1 * | 2/2005 | Bay et al. | | 141/65 |
| 7,654,219 B2 * | 2/2010 | Armstrong | | 116/276 |

FOREIGN PATENT DOCUMENTS

CN    201147297 Y   * 11/2008

* cited by examiner

*Primary Examiner* — Hezron E Williams
*Assistant Examiner* — Mark A Shabman
(74) *Attorney, Agent, or Firm* — Suiter Swantz pc llo

(57) ABSTRACT

A sight assembly may include a body portion configured to couple between a first fluid transport segment and a second fluid transport segment. The body portion may define an aperture configured for fluid flow through an interior of the body portion. The sight assembly may also include a light source disposed within the body portion. The light source may be configured to provide illumination of the interior of the sight assembly. The light source may be disposed within the body portion approximately between an outer edge of the body portion forming the aperture and an external surface of the body portion.

20 Claims, 8 Drawing Sheets

ILLUMINATED SIGHT GLASS

FIELD

The present disclosure generally relates to the field of sight glasses, and more particularly to an illuminated sight glass for carrying fluids there-through.

BACKGROUND

In fluid flow systems, it may be desirable to visually inspect fluid flowing through the system. For instance, visual inspection may be important when dispensing a fluid from a portable storage tank to an underground storage tank, or to an otherwise opaque depository.

SUMMARY

A sight assembly may include a body portion configured to couple between a first fluid transport segment and a second fluid transport segment. The body portion may define an aperture configured for fluid flow through an interior of the body portion. The sight assembly may also include a light source disposed within the body portion. The light source may be configured to provide illumination of the interior of the sight assembly. The light source may be disposed within the body portion approximately between an outer edge of the body portion forming the aperture and an external surface of the body portion.

A fluid transport system may include a first container, a second container, and a coupler coupled between the first container and the second container. The coupler may include: a body portion and a light source disposed within the body portion. The body portion may define an aperture configured for fluid flow through an interior of the body portion. The light source may be configured to provide illumination of the interior of the sight assembly. The light source may be disposed within the body portion approximately between an outer edge of the body portion forming the aperture and an external surface of the body portion. The fluid transport system may be configured to permit fluid flow from the first container through the coupler to the second container.

An illuminated sight glass may include a body portion. The body portion may define an aperture configured for fluid flow through an interior of the body portion. The illuminated sight glass may also include a light source connected to the body portion. The light source may be configured to provide illumination of the interior of the illuminated sight glass. The body portion may further define a plurality of mounting apertures. The plurality of mounting apertures may at least partially surround an outer edge of the body portion defining the aperture configured for fluid flow through the interior of the body portion.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the presently preferred embodiments of the present disclosure, examples of which are illustrated in the accompanying drawings.

Figure 1:
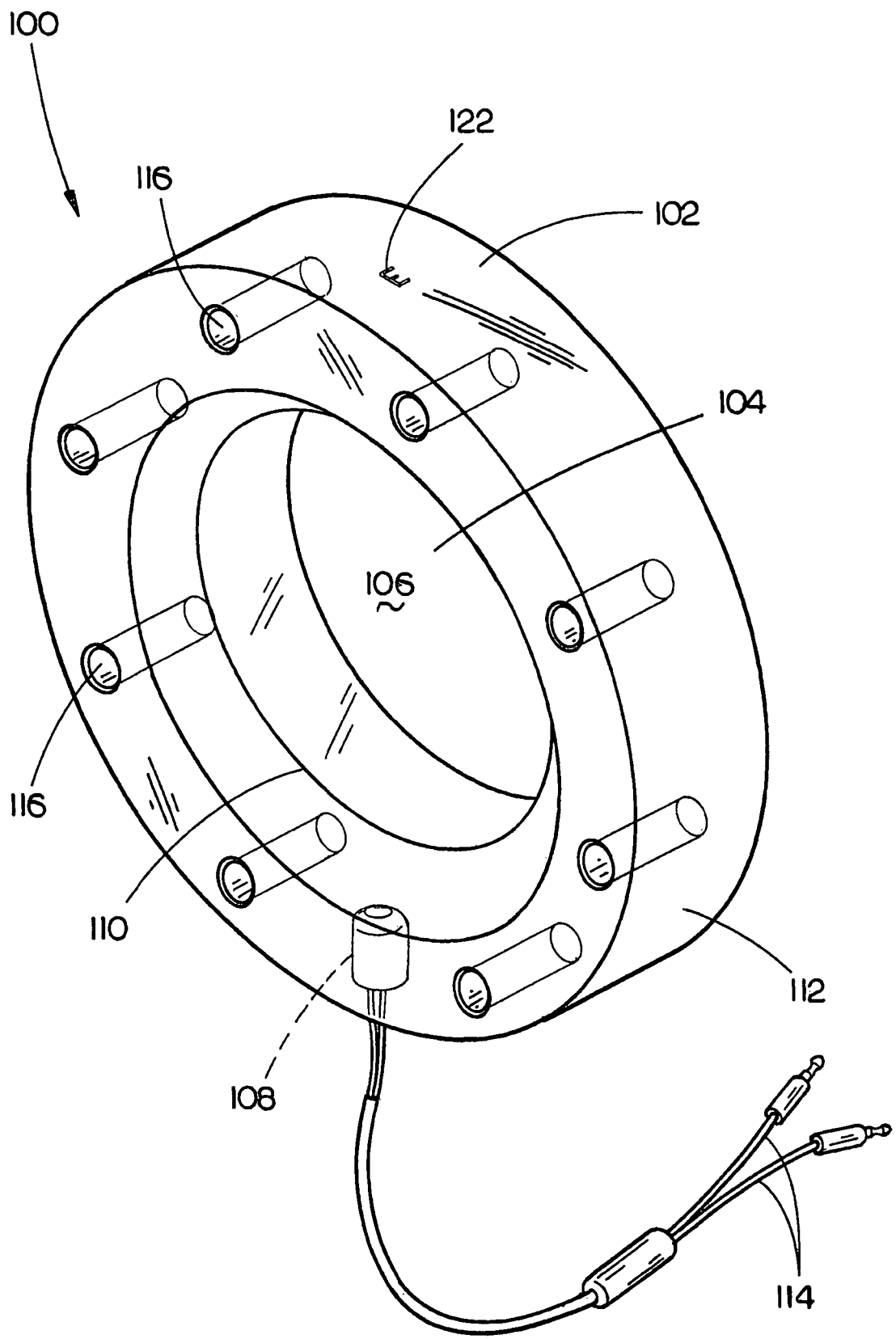
FIG. 1 is an isometric view of an illuminated sight glass according to an embodiment of the present disclosure.

Referring to FIG. 1, an isometric view of an illuminated sight glass 100 is shown in accordance with an embodiment of the present disclosure. The illuminated sight glass 100 may comprise a body portion 102 for coupling between a first fluid transport segment and a second fluid transport segment. For instance, the first fluid transport segment may be a flange of a fluid transport pipe, such as on a fuel tanker, and the second fluid transport segment may be a valve, such as a butterfly valve on a fuel tanker. The body portion 102 may define an aperture 104 configured for fluid flow through an interior 106 of the body portion 102. Thus, when the illuminated sight glass 100 is coupled between a first fluid transport segment and a second fluid transport segment, the illuminated sight glass 100 may provide a continued interior through which fluid may pass, such as from the first fluid transport segment through the illuminated sight glass 100 to the second fluid transport segment. In one embodiment, the aperture 104 is substantially circular, which may enable a continuous flow of fluid when the first fluid transport segment and the second fluid transport section each have a substantially circular interior, such as with piping.

The body portion 102 may be formed of a substantially transparent or translucent material, such that the interior 106 of the illuminated sight glass 100 may be substantially viewable when viewed from an external viewpoint. For example, the body portion 102 may be formed of an acrylic-based material. It will be appreciated that the material forming the body portion 102 may be selected based upon an operating environment of the illuminated sight glass 100. For instance, where the fluid flowing through the illuminated sight glass 100 includes at least a portion of ethanol, the body portion 102 may be formed of an ethanol-approved clear substrate. The body portion may include a marker 122 which may provide an indication in which operating environments the illuminated sight glass 100 may perform. For instance, an 'E' marker 122 may indicate that the illuminated sight glass 100 may be suitable for use with ethanol-containing fluids. In one embodiment, the body portion 102 is formed from an ethanol-approved clear substrate and treated by an annealing process. The body portion 102 may then be polished, such as via exposure to an abrasive polishing substance and/or exposure to a relatively high temperature environment (e.g., exposure to flame). A polishing treatment may enhance the transparent or translucent attributes of the body portion 102.

The illuminated sight glass 100 may also comprise a light source 108. For instance, the light source 108 may be connected to the body portion 102 and be configured to provide illumination of the interior 106 of the illuminated sight glass 100. In one embodiment, the light source 108 may be a light-emitting diode (LED) or another light source which meets regulatory standards for use in hydrocarbon fuel transportation, such as standards set by the American Petroleum Institute (API). For example, the light source 108 may be a Super LED manufactured as a 12-volt light. In a particular embodiment, the light source 108 is disposed within the body portion 102, such as between an outer edge 110 of the body portion 102 forming the aperture 104 and an external surface 112 of the body portion 102. Such a configuration may also be seen with reference to FIGS. 2 and 3. A light source 108 disposed within the body portion 102, as opposed to external the body portion 102 or internal 106 (such as within aperture 104), may permit a safer light source, such as by dissipating heat or by limiting exposure to fluids (such as oxygen or fuel). Such an assembly may be configured for use in petrochemical transportation and unloading.

Figure 2:
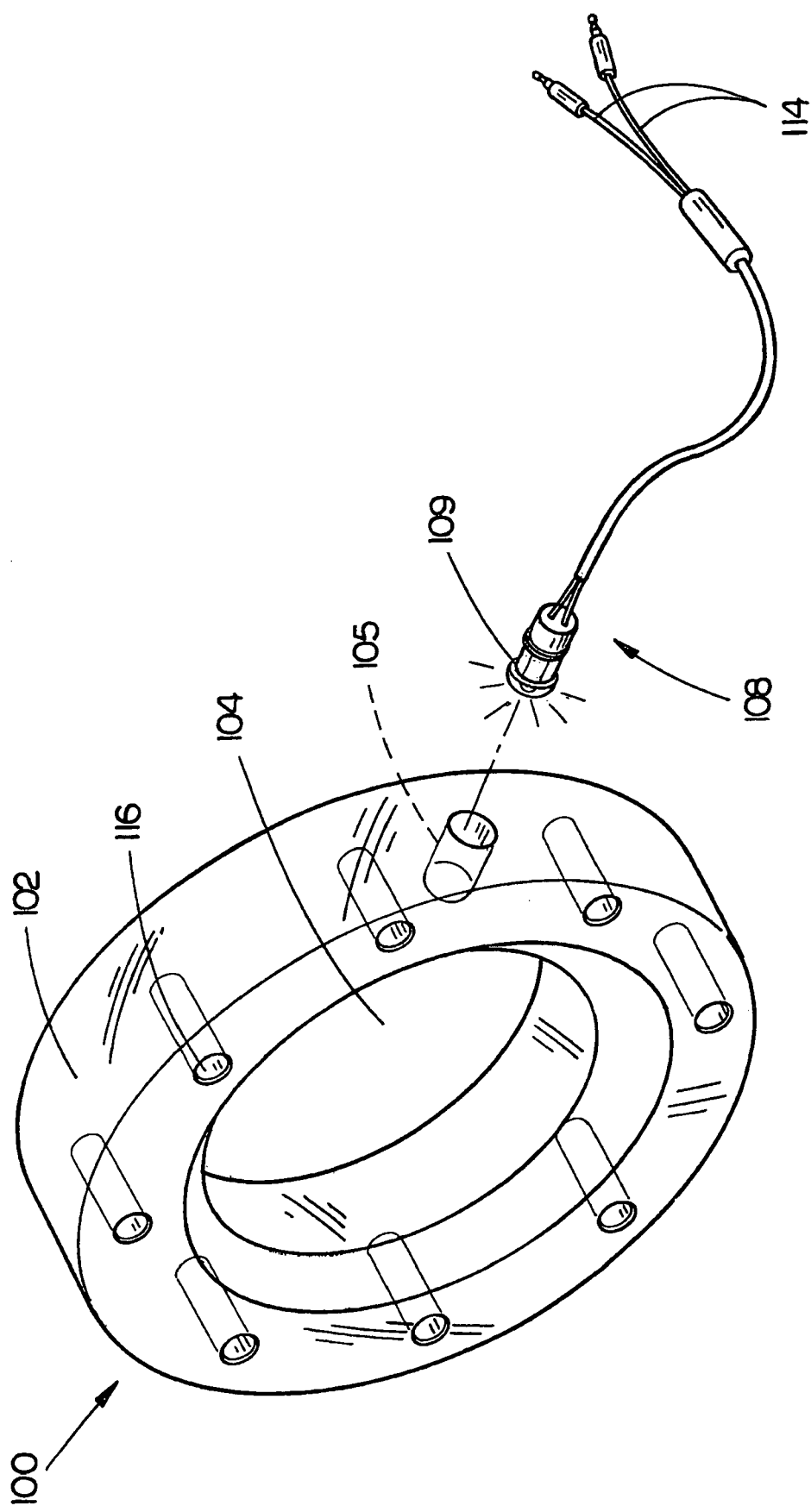
FIG. 2 is an exploded view of the illuminated sight glass of FIG. 1.
Figure 3:
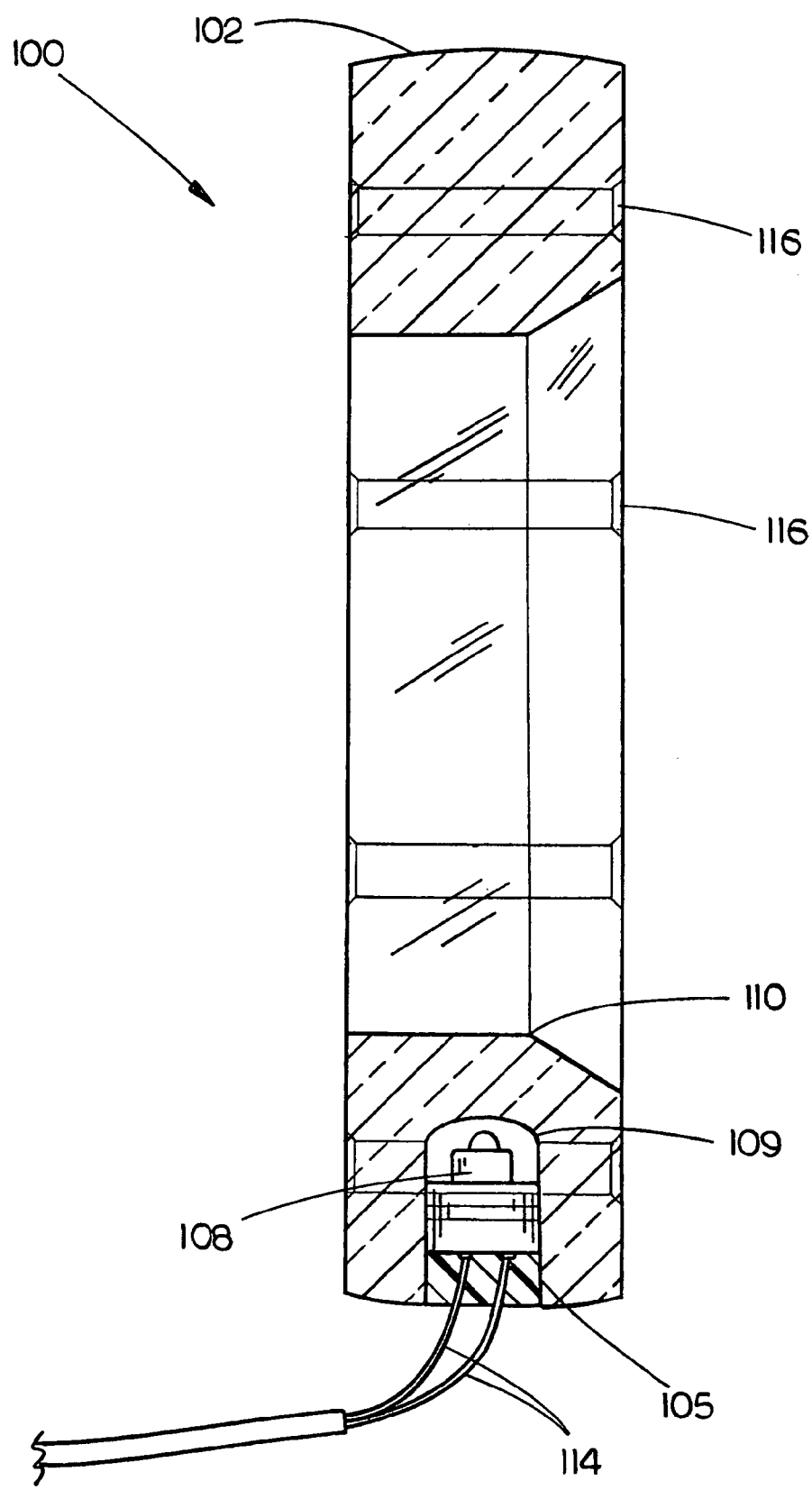
FIG. 3 is a partial side view of the illuminated sight glass of FIG. 1.

Additionally, the light source 108 may be introduced to the body portion 102 as an enclosed assembly (e.g., a sealed unit 109). For example, the light source 108 may be enclosed within an assembly such that the exposure of the light source 108 to the local environment is at least partially limited. As shown in FIGS. 2 and 3, the sealed unit 109 of the light source 108 is introduced to an aperture 105 formed by the body portion 102. The sealed unit 109 may be coupled to the body portion 102 by a sealant, adhesive, epoxy, or the like, such as to enable a secure coupling. For instance, the sealed unit 109 may be coupled to the body portion 102 via an epoxy to form an air-tight seal.

The combination of the light source 108 with the body portion 102 formed of a substantially transparent or translucent material provides the illuminated sight glass a variety of advantages. For instance, such advantages may include, but are not limited to, enabling usage in various lighting environments, from daytime use, to nighttime use, providing a visual inspection of rate of fluid flow, providing a visual inspection of fluid characteristics (e.g., color, viscosity, turbidity, and the like), and the providing a visual inspection of the presence of vapor return.

The light source 108 may include conductive connectors 114 for connecting the light source 108 to a power source (not shown). For instance, the power source may be a direct current power source, such as a battery, or may be another suitable power source which is sufficient for supplying power to the light source 108, as is known in the art. The conductive connectors 114 may be of a variable length, such as depending on a desirable distance from a power source. For instance, it may be desirable to place the power source sufficiently far from the light source 108, such as in an area where the accumulation of flammable vapors is of lesser concern, such as near an engine of a vehicle transporting a fuel tank. The conductive connectors 114 may be covered in a material to reduce flammability concerns. For example, the conductive connectors 114 may be covered with a heat-shrinkable tubing, and may shield the conductive connectors 114 via a plurality of layers of material.

The body portion 102 may further define one or more mounting apertures 116. In the embodiment shown in FIG. 1, eight mounting apertures 116 are displayed. The mounting aperture 116 is configured to receive a mounting fastener. For instance, a fastener may be inserted into the mounting aperture 116 when coupling the illuminated sight glass 100 between a first fluid transport segment and a second fluid transport segment. In a particular embodiment, the positioning of the mounting apertures 116 may be configured to substantially match a pattern typically used on flanges for securing a pair of pipe segments, such as for meeting regulatory standards. The mounting apertures 116 are displayed with inserted fasteners in FIGS. 6-8B, where the illuminated sight glass 100 is coupled between a first fluid transport segment 304 and a second fluid transport segment 306, which may include butterfly valve 302.

Figure 4:
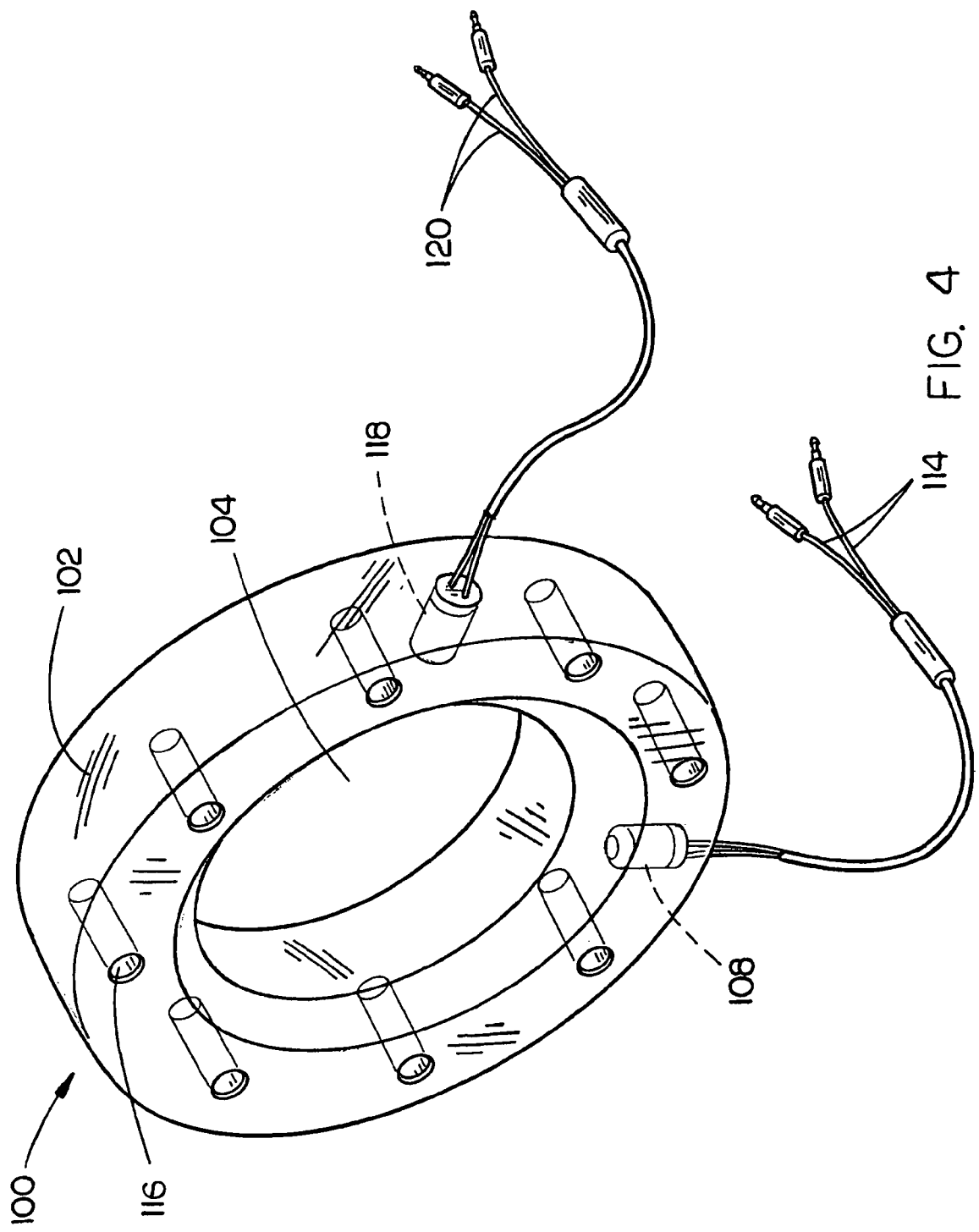
FIG. 4 is an isometric view of an illuminated sight glass according to another embodiment of the present disclosure.

The illuminated sight glass 110 may further include a second light source 118, as shown in FIG. 4. The second light source 118 may be coupled with the body portion 102 is a manner substantially similar to that of the first light source 108. The second light source 118 may also be configured to provide illumination of the interior 106 of the illuminated sight glass 100. For instance, the second light source 118 may be disposed within the body portion 102, such as between an outer edge 110 of the body portion 102 forming the aperture 104 and an external surface 112 of the body portion 102. The second light source 118 may also include conductive connectors 120 for connecting the second light source 118 to a power source (not shown). The second light source 118 may also be a light-emitting diode (LED) or another light source which meets regulatory standards for use in hydrocarbon fuel transportation, such as standards set by the American Petroleum Institute (API).

It is contemplated that the second light source 118 may emit light of a different color than the color emitted by the first light source 108. For instance, the second light source 118 may operate within different or more specific spectrums of visible light as compared to the first light source 108. In one embodiment, the first light source 108 emits a substantially white light, whereas the second light source 118 emits a substantially red light. However, it is contemplated that a variety of colors, whether similar or different, may be utilized by the first light source 108 and the second light source 118 without departing from the scope of the present disclosure.

Figure 5:
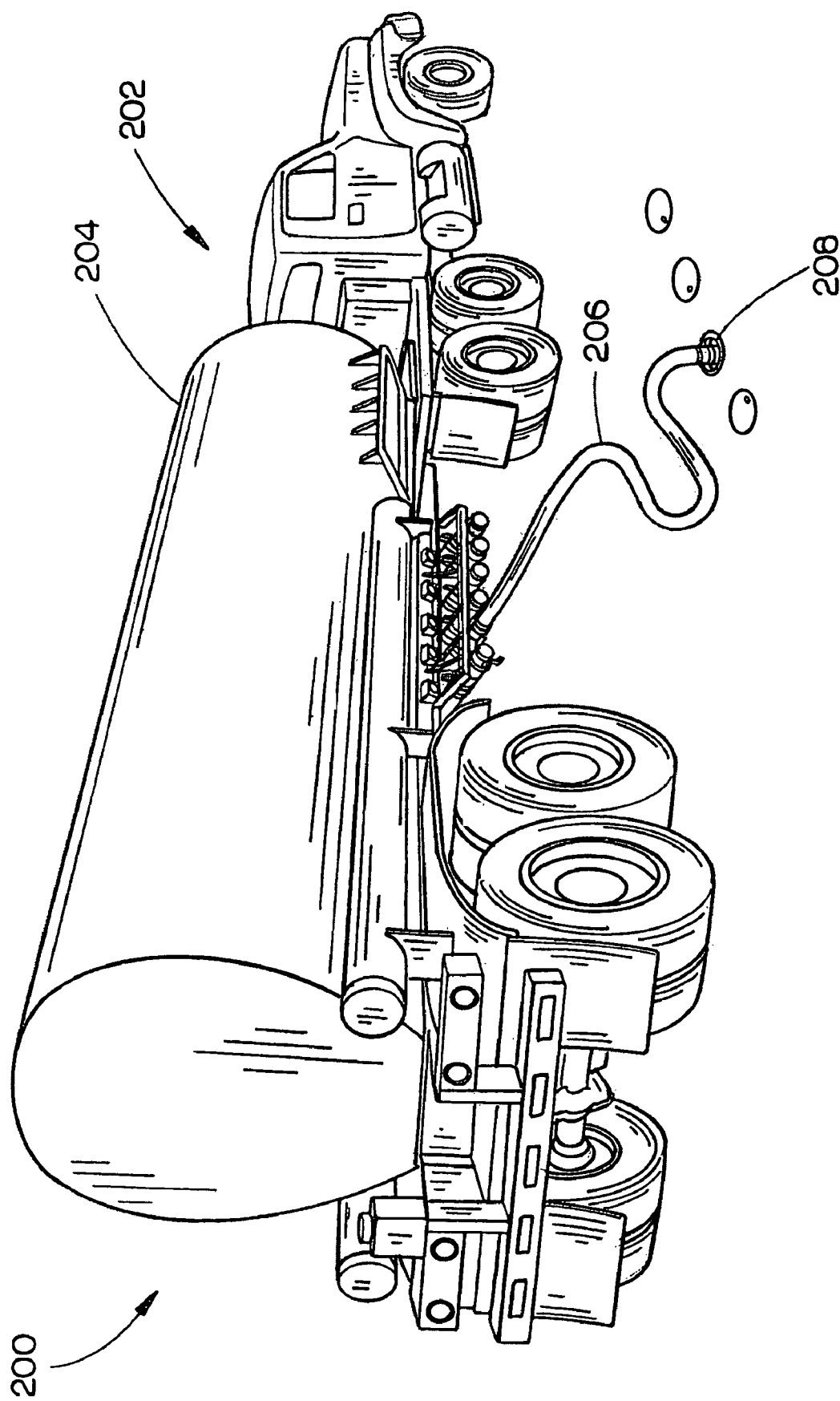
FIG. 5 is a perspective view of a fuel tanker during an unloading process.
Figure 6:
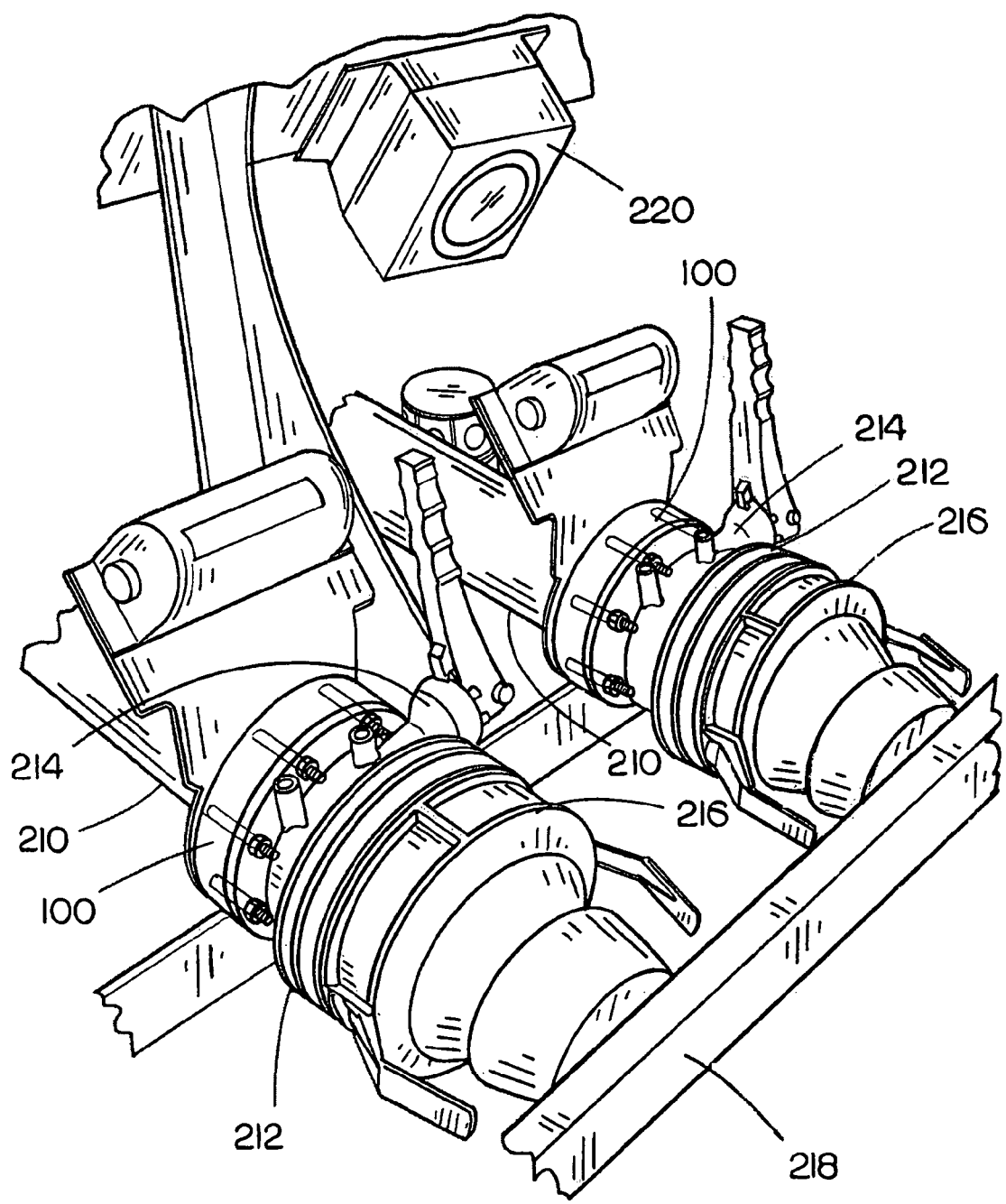
FIG. 6 is a partial isometric view of an illuminated sight glass coupled to a fluid transport system.
Figure 7:
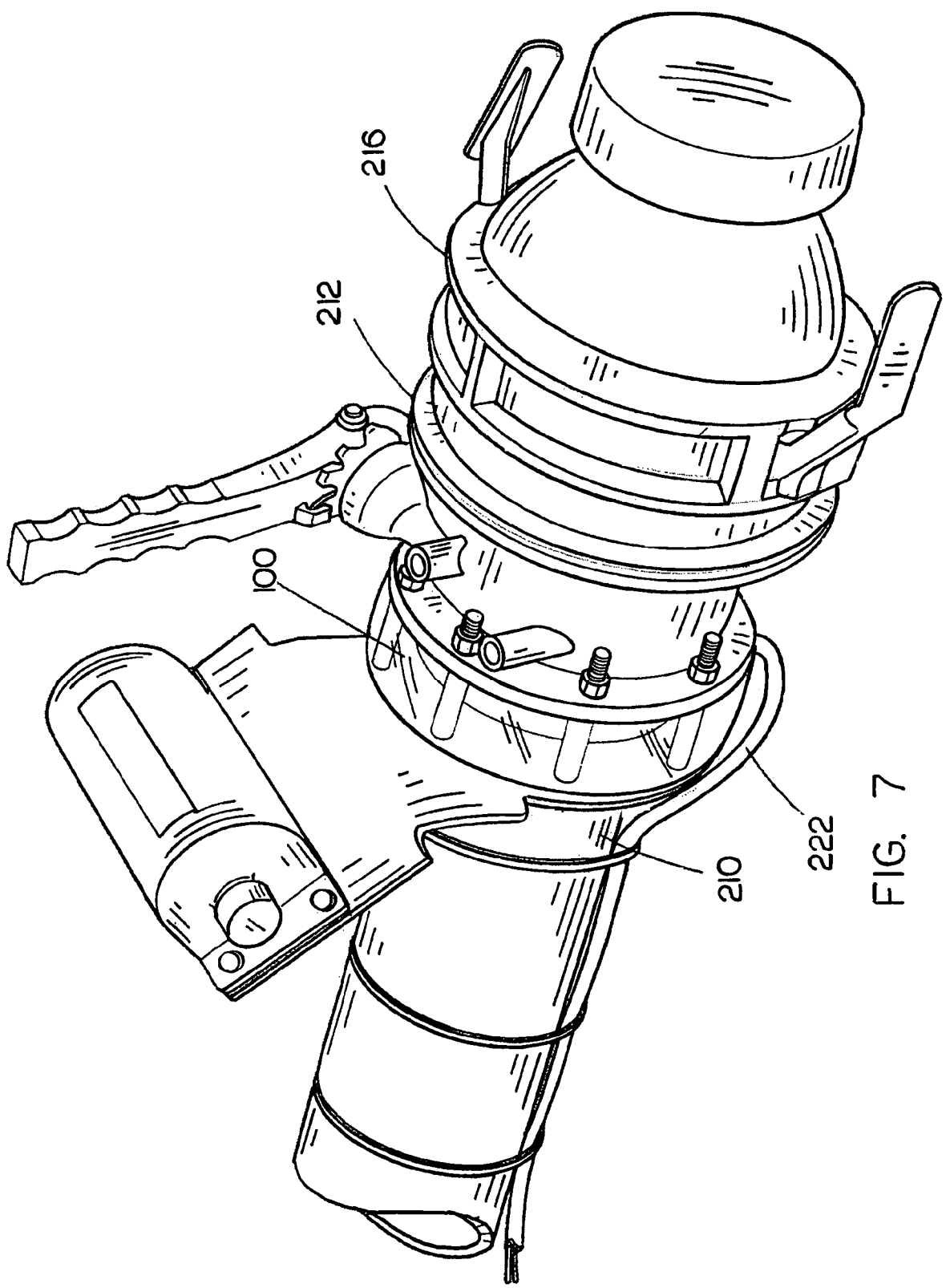
FIG. 7 is another partial isometric view of an illuminated sight glass coupled to a fluid transport system.

Referring now to FIGS. 5-7, an illuminated sight glass 100 is shown coupled as part of a fuel transport system 200. The fuel transport system may include a portable storage tank 204 of a fuel tanker 202, a hose coupling 206, and an underground storage tank accessible by a port 208. The fuel tanker 202 may include the illuminated sight glass 100, which may be utilized during an unloading process. The fuel tanker 202 may be configured to deliver fluids from the portable storage tank 204 through the hose coupling 206 to the underground storage tank via port 208. The illuminated sight glass 100 may be coupled between a first fluid transport segment 210 and a second fluid transport segment 212, as shown in FIGS. 6 and 7. In one embodiment, the first fluid transport segment 210 is a pipe segment of the fuel transport system 200. For example, the pipe segment may extend from and provide access to a cell of the portable storage tank 204. The second fluid transport segment 212 may also include a pipe segment, and may further include a valve 214 and a cap 216, each configured to selectably mitigate or prevent fluid from flowing from the first fluid transport segment 210 to the second fluid transport segment 212. For example, the valve 214 and cap 216 may block fluid flow during transport of the fuel tanker 202 to the location of the underground storage tank. Once the fuel truck arrives, the cap 216 may be removed, and hose coupling 206 may be coupled to the second fluid transport segment 212. When the hose coupling 206 is coupled to the second fluid transport segment 212 and to the port 208, the valve 214 may be engaged, allowing fluid to flow from the portable storage tank 204 to the underground storage tank via port 208.

The fuel transport system 200 may also include an interlocking bar 218, configured to prevent access to the cap 216 while the interlocking bar 218 is in an engaged position, such as that shown in FIG. 6. The interlocking bar 218 may be disengaged to provide access to the cap 216, and thereafter the cap 216 may be removed to allow the passage of fluid from the portable storage tank 204 to the underground storage tank. Thus, the interlocking bar 218 may provide an additional safety mechanism for the transport and passage of fluids.

The fuel transport system 200 may additionally include an unloading light 220 and a conduit 222 for containing conductive connectors 114 and/or 120 from the light source 108 and/or second light source 118 to the power source. The unloading light 220 may provide illumination to an area of the fuel transport system 200, which may provide an operator with light, enabling the operator to view the interlocking bar 218, the cap 216, and the like. The conduit 222 may be coupled to the first fluid transport segment 210, which may enable the conductive connectors 114 and/or 120 to connect the light source 108 and/or the second light source 118 to a remote power source, such as one closer to a cab of the fuel tanker 202.

Figure 8A:
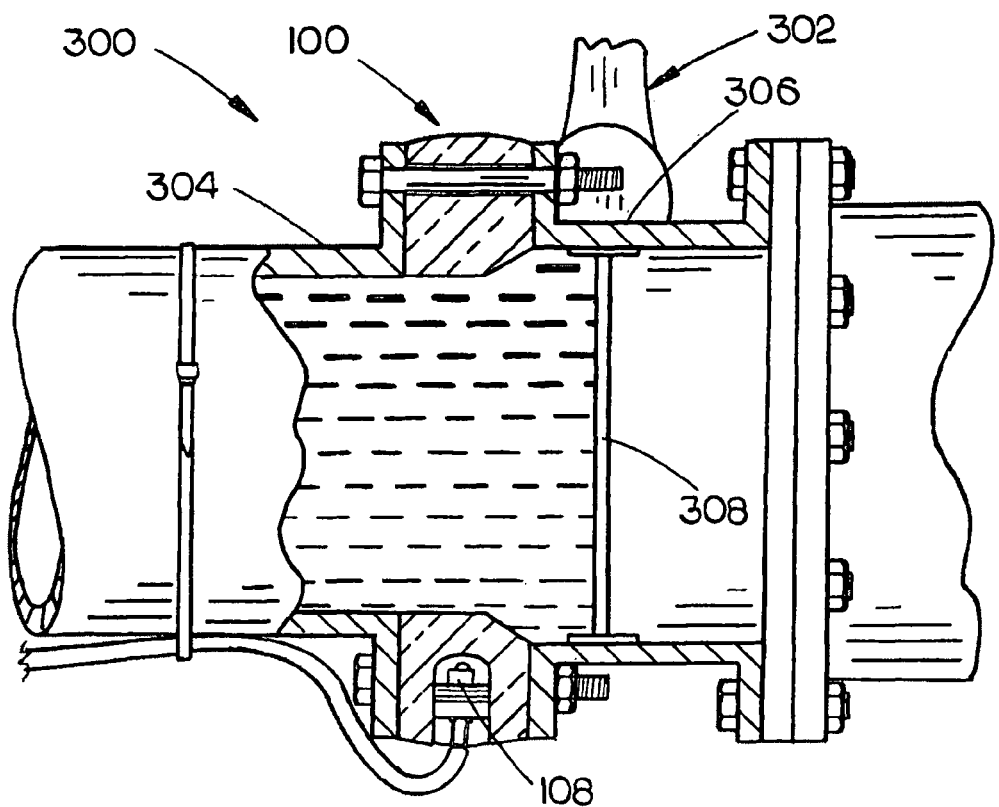
FIG. 8A is a partial cross-sectional side view of an illuminated sight glass coupled to a fluid transport system with a butterfly valve in a closed position.
Figure 8B:
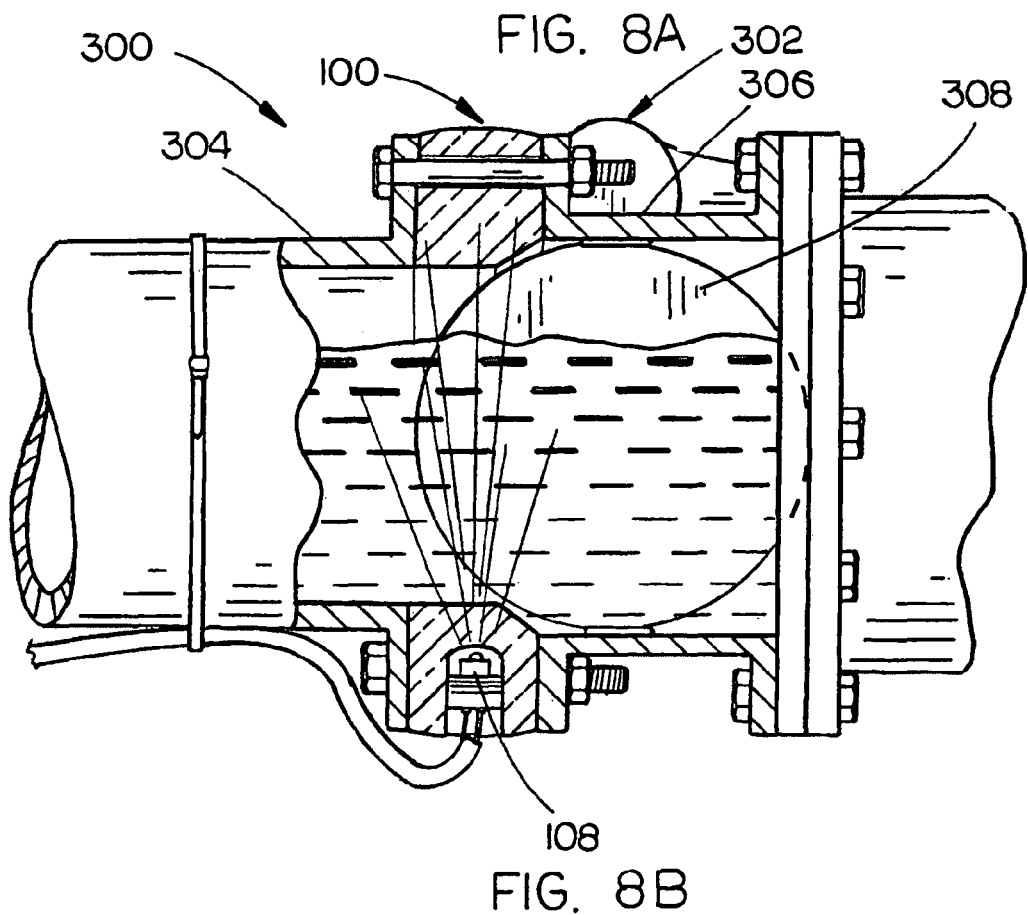
FIG. 8B is a partial cross-sectional side view of an illuminated sight glass coupled to a fluid transport system with a butterfly valve in an open position.

Referring now to FIGS. 8A and 8B, a partial cross-sectional side view of the illuminated sight glass 100 coupled to a fluid transport system 300 with a butterfly valve 302 is displayed. As shown, the illuminated sight glass 100 is coupled between a first fluid transport segment 304 and a second fluid transport segment 304. The second fluid transport segment 306 includes the butterfly valve 302 in a closed position, as shown in FIG. 8A, whereas the butterfly valve 302 is in an open position in FIG. 8B. The butterfly valve 300 comprises a disc 308 which is rotatably coupled within the second fluid transport segment 306, and has dimensions which substantially match an interior dimension of the second fluid transport segment 306. For instance, in the embodiments shown in FIGS. 8A and 8B, the disc 308 has a circumference which substantially matches an internal circumference of the portion of the second transport segment 306 where the valve resides. The disc 308 may be rotated between a closed position (e.g., substantially perpendicular to the second fluid transport segment 306) and an open position (e.g., substantially parallel to the second fluid transport segment). When the butterfly valve 302 is in a closed position, the disc 308 substantially blocks the flow of fluid within the fluid transport system 300. When the butterfly valve 302 is in an open position, the disc 308 permits the flow of fluid within the fluid transport system 300.

The illuminated sight glass 100 may include a groove 124 for receiving the disc 308 of the butterfly valve 302 as the disc 308 is rotated between an open position and a closed position. The groove 124 may take the form of a rabbet or other feature, such that the internal space of the illuminated sight glass 100 is of a sufficient size to accept the disc 308 of the butterfly valve. In the embodiment shown in FIG. 3, where the interior 106 is circular, the groove 124 features an increasing diameter for accepting the disc 308 of the butterfly valve.

The first light source 108 may be configured to provide visual cues regarding fluid transport through the illuminated sight glass 100 and accordingly, through the fluid transport system 300. For instance, the first light source 108 may be configured to refrain from operating (e.g., refrain from emitting light) when fluid does not flow from the first fluid transport segment 304 to the second fluid transport segment 306. In one embodiment, when butterfly valve 302 is in a closed position, and fluid is prevented from flowing (as shown in FIG. 8A), the first light source 108 does not emit light. However, the first light source 108 may be configured to operate (e.g., to emit light) when fluid is flowing from the first fluid transport segment 304 to the second fluid transport segment 306. For example, when the butterfly valve is in an open position (as shown in FIG. 8B), fluid is permitted to flow within fluid transport system 300 (e.g., from the first fluid transport segment 304 to the second fluid transport segment 308), and the first light source 108 emits light.

Determining whether fluid is flowing from the first fluid transport segment 304 to the second fluid transport segment 308 may be accomplished according to any suitable means known in the art. For example, the illuminated sight glass 100 may include a fluid detector. The fluid detector may include a detector for detecting fluid flow through the interior 106 of the body portion 102. In one embodiment, the fluid detector includes a piezo-electric cell for measuring fluid flow. In another embodiment, the fluid detector may include a sensor, a flow meter, an optical device, or another device suitable for detecting the flow of fluid within a closed environment.

Additionally, the position of the disc 308 of the butterfly valve 302 may be measured as a proxy for fluid flow through the fluid transport system 300. For instance, when the disc is substantially perpendicular to the second fluid transport segment 306, then fluid should not be flowing, and thus the first light source 108 may remain off. When the disc is in a position that is not substantially perpendicular to the second fluid transport segment 306, then fluid may flow, and the first light source 108 may operate. However, it is contemplated that a backup sensor may be used in conjunction with using the disc 308 position as a proxy for fluid flow. For example, if the butterfly valve 302 malfunctions and fluid is permitted to pass by the valve, then a backup sensor may cause the first light source 108 to operate.

In an embodiment, the second light source 118 is configured to provide visual cues regarding a status of a fluid source. For example, the second light source 118 may be configured to operate (e.g., to emit light) when fluid in the fluid transport system 300 is below a threshold volume/weight. The fluid source may be a storage tank, such as one or more cells of a fuel tank of a fuel transport vehicle. In one embodiment the second light source 118 operates when fluid in a cell of a fuel tank is substantially empty. The fluid transport system may include a volumetric and/or weight measurement device for measuring at least one of a volume or a weight of fluid. For instance, the volumetric and/or weight measurement device may be used to determine whether fluid in the fluid transport system 300 is below a threshold volume/weight. The volumetric and/or weight measurement device may be any measurement device known in the art such as, but not limited to, a piezo-electric device, a sensor, a flow meter, an optical device, a scale for obtaining a weight difference, or another device suitable for measuring at least one of a volume or a weight of fluids. Such measurements may be evaluated to determine whether fluid in the fluid transport system 300 is below a threshold volume/weight. For instance, the fluid transport system 300 may include a processor for performing calculations to determine whether a measured volume or weight of fluid is at, above, or below a threshold value.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A sight assembly, comprising:
a body portion configured to couple between a first fluid transport segment and a second fluid transport segment, the body portion defining an aperture configured for fluid flow through an interior of the body portion; and
a light source sealed within the body portion, the light source configured to provide illumination of the interior of the sight assembly,
wherein the light source is disposed within the body portion approximately between an outer edge of the body portion forming the aperture and an external surface of the body portion, and wherein the light source is pointed substantially toward a center of the aperture.

2. The sight assembly of claim 1, wherein the light source is at least one of a light-emitting diode (LED) or a light source meeting a regulatory standard.

3. The sight assembly of claim 1, further comprising:
a second light source connected to the body portion.

4. The sight assembly of claim 3, wherein the second light source is configured to emit light of a color substantially different than a color the first light source is configured to emit.

5. The sight assembly of claim 1, further comprising:
means for detecting fluid flow through the interior of the body portion.

6. The sight assembly of claim 1, wherein the body portion further defines a plurality of mounting apertures, each of the plurality of mounting apertures configured to receive a mounting fastener.

7. A fluid transport system, comprising:
a first container;
a second container; and
a coupler coupled between the first container and the second container, the coupler including:
a body portion, the body portion defining an aperture configured for fluid flow through an interior of the body portion;
a light source sealed within the body portion, the light source configured to provide illumination of the interior of the sight assembly,
wherein the light source is disposed within the body portion approximately between an outer edge of the body portion forming the aperture and an external surface of the body portion, and wherein the light source is pointed substantially toward a center of the aperture,
wherein the fluid transport system is configured to permit fluid flow from the first container through the coupler to the second container.

8. The fluid transport system of claim 7, wherein the light source is at least one of a light-emitting diode (LED) or a light source meeting a regulatory standard.

9. The fluid transport system of claim 7, further comprising:
a second light source connected to the body portion.

10. The fluid transport system of claim 9, further comprising:
means for measuring at least one of a volume or a weight of fluid in at least one of the first container, the second container, or the coupler.

11. The fluid transport system of claim 10, wherein the second light source is configured to emit light when the means for measuring at least one of a volume or a weight of fluid measures at least one of a volume or a weight below a threshold value.

12. The fluid transport system of claim 7, wherein the body portion further defines a plurality of mounting apertures, each of the plurality of mounting apertures configured to receive a mounting fastener.

13. The fluid transport system of claim 12, wherein the plurality of mounting apertures are positioned in a substantially circular configuration.

14. The fluid transport system of claim 7, further comprising:
a power source, the power source configured to provide power to the light source.

15. The fluid transport system of claim 14, wherein the power source is positioned in a location remote from the coupler.

16. An illuminated sight glass, comprising:
a body portion, the body portion defining an aperture configured for fluid flow through an interior of the body portion;
a light source sealed within the body portion, the light source configured to provide illumination of the interior of the illuminated sight glass,
wherein the body portion further defines a plurality of mounting apertures, the plurality of mounting apertures at least partially surrounding an outer edge of the body portion defining the aperture configured for fluid flow through the interior of the body portion, wherein the light source is disposed within the body portion approximately between the outer edge of the body portion forming the aperture and an external surface of the body portion, and wherein the light source is pointed toward the interior of the body portion.

17. The illuminated sight glass of claim 16, further comprising:
a second light source connected to the body portion.

18. The illuminated sight glass of claim 16, wherein the body portion is comprised of at least one of an acrylic material or a cross-linked acrylic material.

19. The illuminated sight glass of claim 16, wherein the body portion and the aperture are each substantially circular.

20. The illuminated sight glass of claim 16, wherein the light source is sealed within the body portion via an epoxy seal.

* * * * *